(12) United States Patent
Pastrick et al.

(10) Patent No.: US 6,872,080 B2
(45) Date of Patent: *Mar. 29, 2005

(54) PROGRAMMABLE AED-CPR TRAINING DEVICE

(75) Inventors: John J. Pastrick, University Heights, OH (US); Steven W. Lindseth, Gates Mills, OH (US)

(73) Assignee: Cardiac Science, Inc., Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 400 days.

(21) Appl. No.: 09/494,590

(22) Filed: Jan. 31, 2000

(65) Prior Publication Data

US 2003/0036044 A1 Feb. 20, 2003

Related U.S. Application Data

(60) Provisional application No. 60/117,727, filed on Jan. 29, 1999.

(51) Int. Cl.[7] .............................................. G09B 23/28
(52) U.S. Cl. ...................... 434/262; 434/265; 434/266; 434/267; 607/5
(58) Field of Search ................................ 434/118, 262, 434/265–267, 272, 307 R, 308, 322, 323, 362, 365, 428; 128/903; 600/390, 508; 601/1, 41, 44, 151; 607/5–7, 60

(56) References Cited

U.S. PATENT DOCUMENTS

| | | | |
|---|---|---|---|
| 4,360,345 A | * | 11/1982 | Hon ........................... 434/262 |
| 4,588,383 A | | 5/1986 | Parker et al. |
| 4,610,254 A | | 9/1986 | Morgan et al. |
| 5,243,975 A | | 9/1993 | Alferness et al. |

(List continued on next page.)

OTHER PUBLICATIONS

Copy of the statement to verify the 27 pages of the "AED Trainer—directionsfor use" of LaerdalMedical corporation which is published prior 1996.*

Primary Examiner—Joe H. Cheng
(74) Attorney, Agent, or Firm—Calfee, Halter & Griswold LLP

(57) ABSTRACT

A portable, interactive electronic training device for prompting a trainee on the proper sequence of steps for performing CPR, using a defibrillator and performing CPR in conjunction with the use of a defibrillator. The device simulates the obtaining of direct information about a patient's condition, such as ECG data collected directly from the patient. The device receives information pertinent to the treatment of the patient indirectly through an operator of the device. The device prompts a trainee on the medically appropriate action such as a defibrillation shock in response to the indirect and direct information. Indirect information is obtained through information processing means that includes means for prompting the operator of the device and means for receiving the operator's responses thereto. Prompts may include both questions and instructions, and in one embodiment the information processing means obtains the assent of the operator before causing the defibrillation shock. Indirect information may include information as to whether the patient is conscious, whether the patient is an adult, baby or child, and as to whether or not cardiopulmonary resuscitation has been performed. The device also prompts the user on proper placement of training electrode pads upon a simulated victim's chest by prompting feedback to the trainee if the pads are not placed on the conductive targets located upon the simulated victim's chest.

12 Claims, 16 Drawing Sheets

U.S. PATENT DOCUMENTS

| | | | |
|---|---|---|---|
| 5,275,572 A | * | 1/1994 | Ungs et al. .................. 434/265 |
| 5,490,820 A | * | 2/1996 | Schock et al. ................ 601/41 |
| 5,549,115 A | | 8/1996 | Morgan et al. |
| 5,611,815 A | | 3/1997 | Cole et al. |
| 5,853,292 A | * | 12/1998 | Eggert et al. ............... 434/262 |
| 5,993,219 A | * | 11/1999 | Bishsy ...................... 434/265 |
| 6,074,213 A | * | 6/2000 | Hon .......................... 434/262 |
| 6,141,584 A | * | 10/2000 | Rockwell et al. .............. 607/5 |
| 6,148,233 A | * | 11/2000 | Owen et al. .................... 607/5 |
| 6,154,673 A | * | 11/2000 | Morgan et al. ................ 607/5 |
| 6,174,295 B1 | * | 1/2001 | Cantrell et al. ............... 601/41 |

* cited by examiner

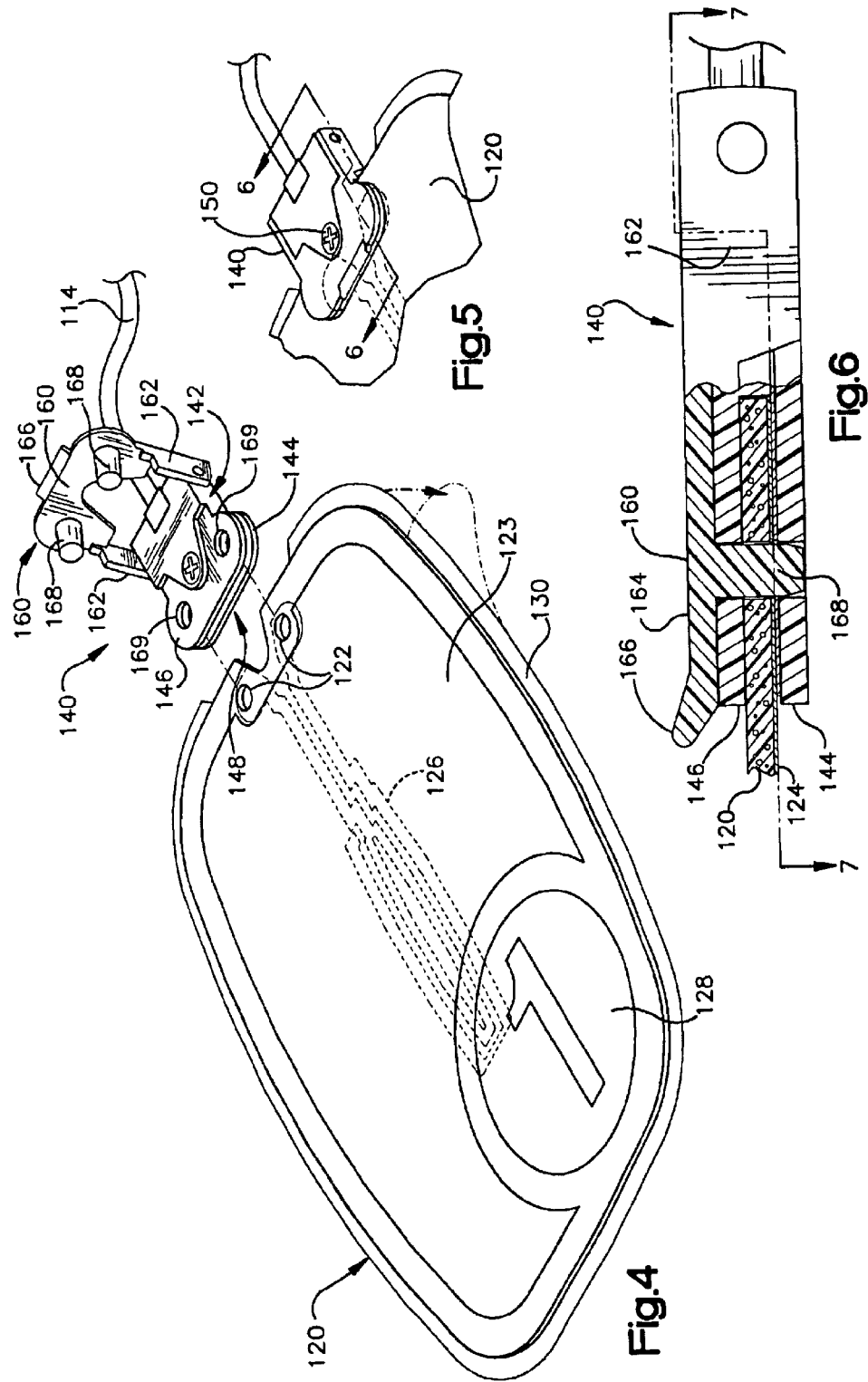

PROGRAMMABLE AED-CPR TRAINING DEVICE

This application claims the benefit of Provisional Application No. 60/117,727, filed Jan. 29, 1999.

FIELD OF THE INVENTION

The present invention pertains generally to a training device used to assist a student operator in rescue procedures, and more particularly a hand-on training device used to assist a student in learning cardiopulmonary resuscitation (CPR), training instructions in the use of a defibrillator and rescue procedures such as rescue breathing and choking procedures.

BACKGROUND OF THE INVENTION

It has been estimated that over 350,000 deaths occur each year in the United States due to cardiac arrhythmia. Many of these deaths could be prevented by rescue procedures such as CPR and defibrillation by properly trained persons in rescue procedures. Thus, there is a continuing need to provide training to the public and to medical personnel in the proper treatment of a patient undergoing cardiac arrest or in need of rescue procedures. In order to train a student properly in rescue techniques, hands-on training aids such as manikins are often utilized. The disadvantage to prior art training aids is that separate devices are often needed to provide the full range of training. For example, CPR manikins and CPR prompting devices are used in training students CPR, while real defibrillator devices are used as defibrillator training aids. These devices can be quite costly. Further, the use of real defibrillator devices in a training environment creates a possible danger of discharging an unintended potent electric shock. Further, these type of devices in general only assist in the instruction of the use of the defibrillator, and do not provide instruction in the use of CPR or other rescue techniques such as rescue breathing. Still further yet, these training devices generally assume that the patient is of a sufficient age to receive shock treatment. In addition, prior art defibrillator and CPR training devices generally do not instruct the trainee to check for a pulse after a victim has received a shock treatment nor after a series of CPR compressions have been given. Finally, these type of training devices do not teach the proper placement of the paddles upon the patient. These and other features and advantages of the invention will become apparent in the detailed description and claims to follow, taken in conjunction with the accompanying drawings.

BRIEF DESCRIPTION OF THE DRAWINGS

FIG. 4 is a perspective view of a training electrode pad and cable shown with a removable attachment clip for insertion onto the training electrode pads.

FIG. 5 is an enlarged perspective view of the removable attachment clip shown in FIG. 4 which is shown installed on the training electrode pad.

FIG. 6 is a side view of the removable attachment clip shown in the direction 6—6 of FIG. 5.

DETAILED DESCRIPTION OF THE INVENTION

Mechanical System

Figure 1:
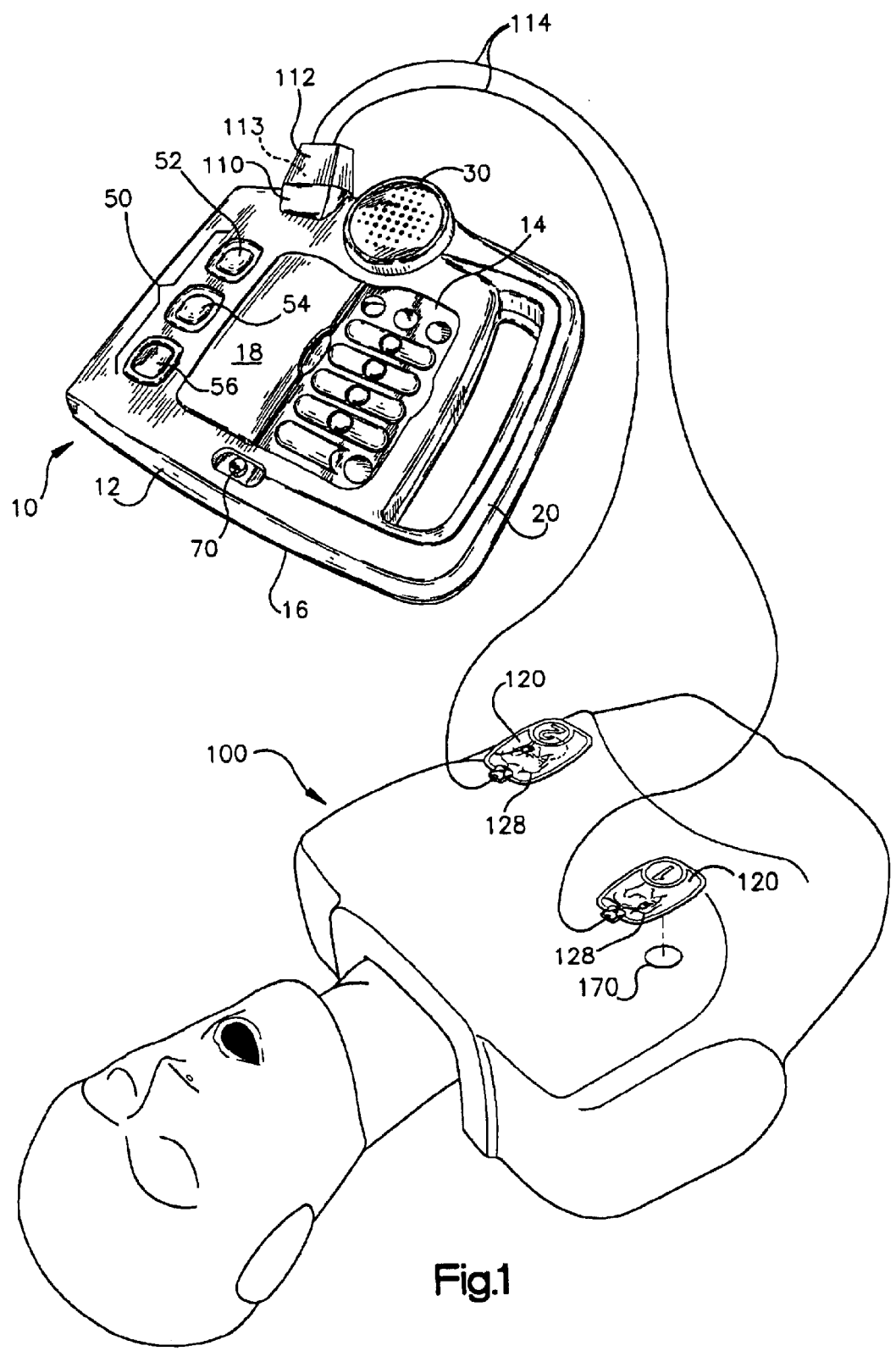
FIG. 1 is a perspective view of a CPR-AED training device shown in use with a manikin according to the present invention.
Figure 2:
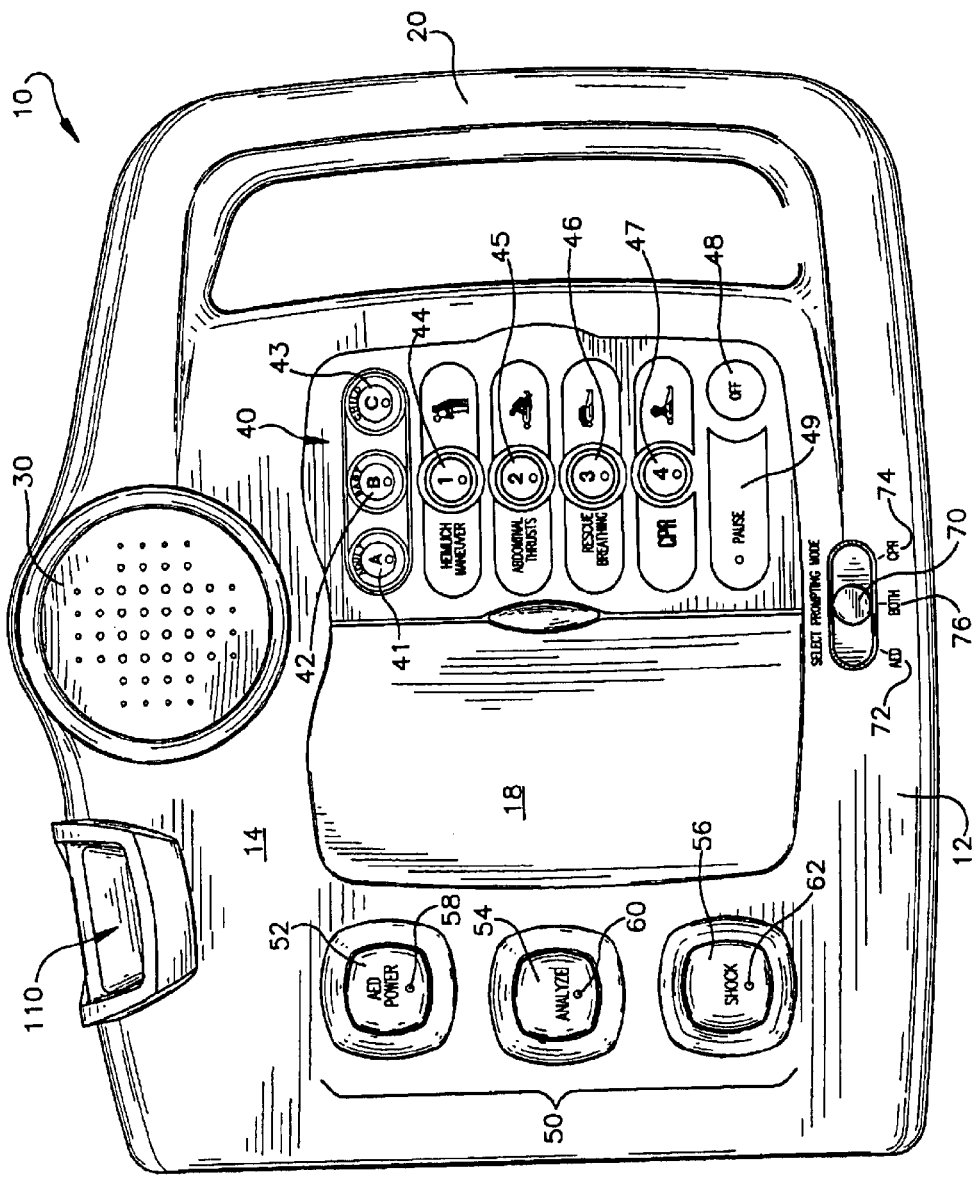
FIG. 2 is a front view of the CPR-AED training device of FIG. 1 with the cover plate removed and the electrodes withdrawn.
Figure 3:
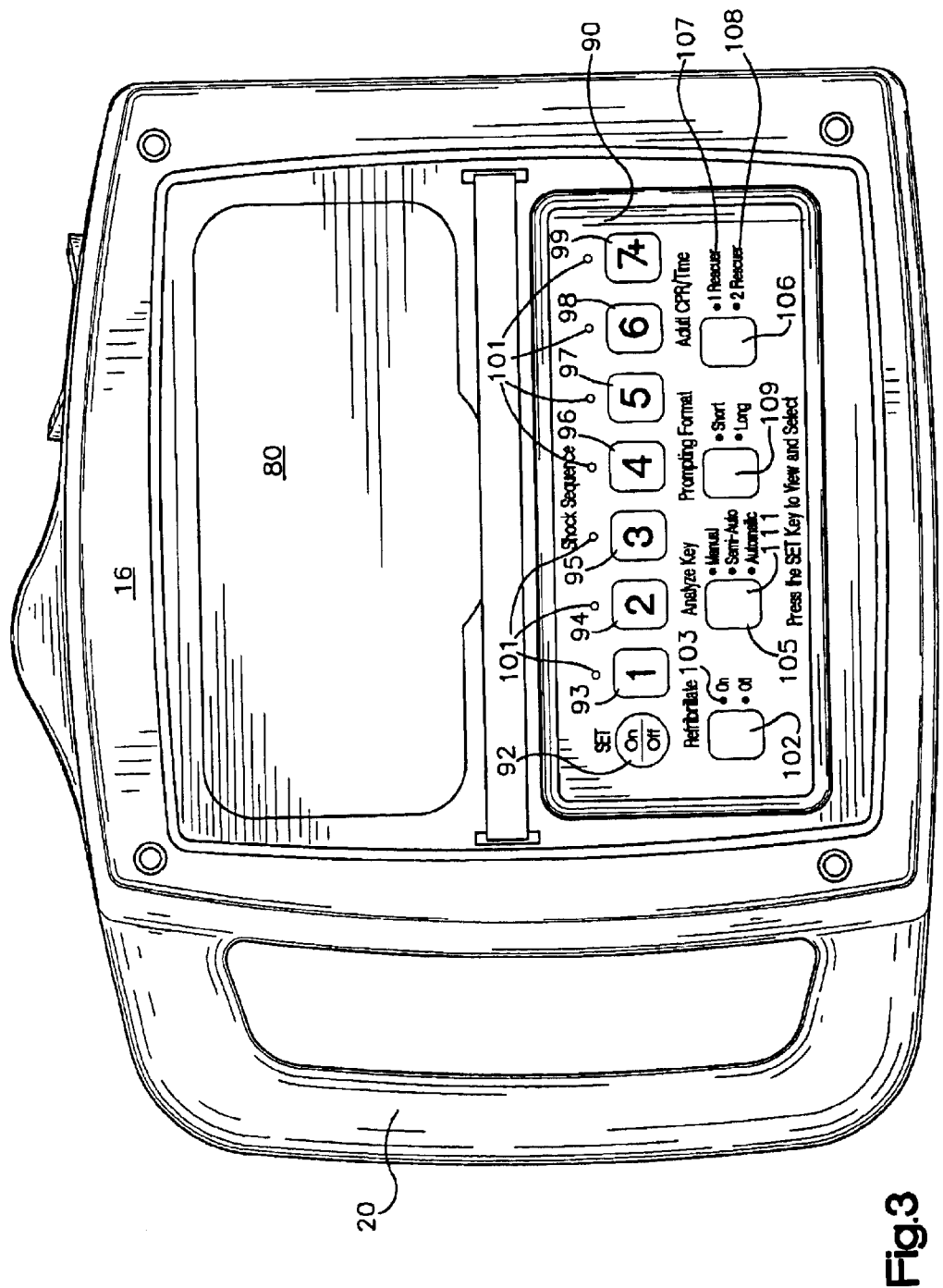
FIG. 3 is a rear view of the CPR-AED training device of FIG. 1 with the programmable display panel in view.
Figure 7:
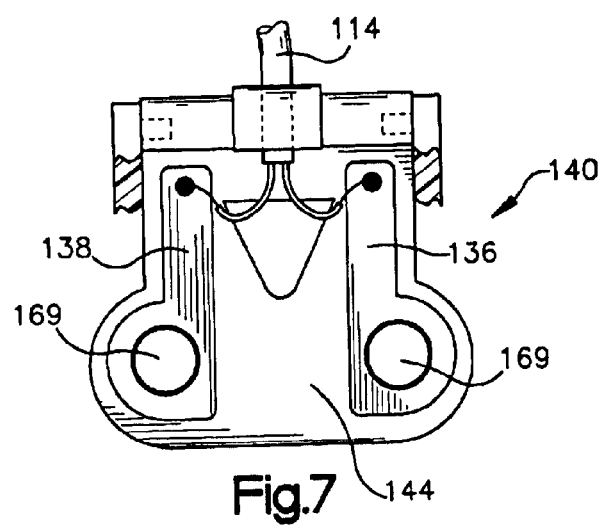
FIG. 7 is an enlarged view of the removable attachment clip shown in the direction 7—7 of FIG. 6.
Figure 8:
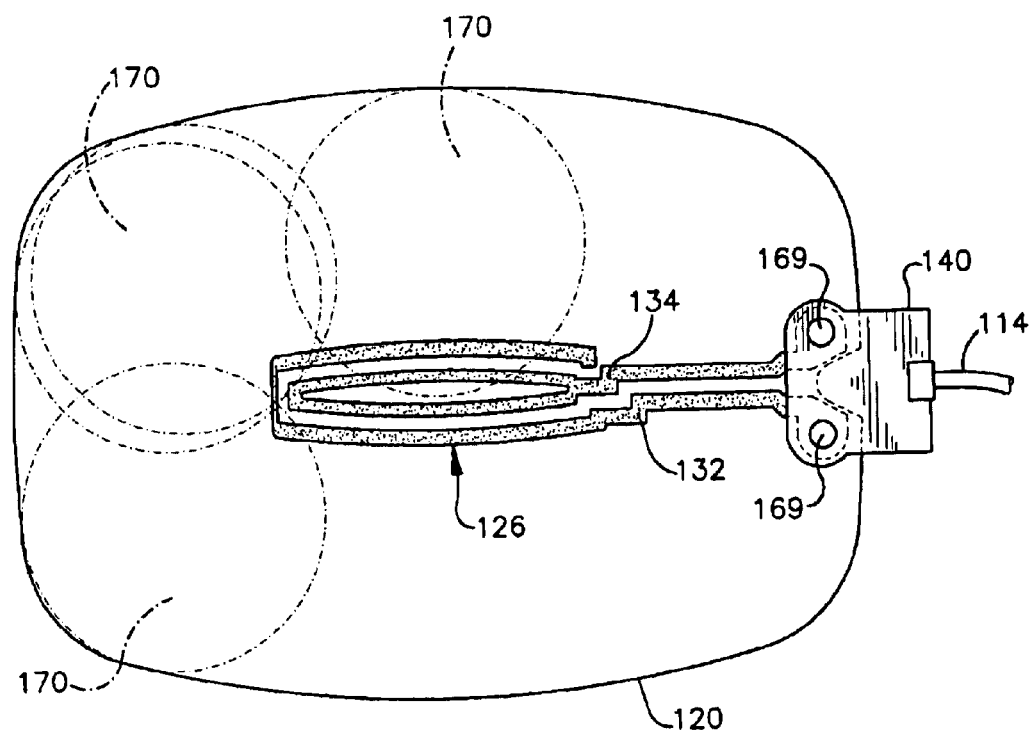
FIG. 8 is a bottom view of a training electrode pad with the target means shown in phantom in several locations.

Referring initially to FIGS. 1–3, a CPR-AED training device 10 of the present invention is shown. The device 10 prompts trainees with instructions on the proper sequence of steps of CPR and defibrillation in a non-emergency setting, with input information from the trainee to the device 10. With respect to the defibrillation prompting, the device 10 allows a trainee to evaluate simulated patient electrocardiogram (ECG) signals and perform simulated defibrillation with or without CPR prompting. As shown in FIG. 1, the device 10 may be used alone or in conjunction with a manikin 100 or other means for simulating a victim. The CPR-AED training device 10 comprises a body 12 having a front panel 14 and a rear panel 16, a cover plate 18, and carrying handle 20. The training device 10 further comprises an audio speaker 30 with volume control (not shown) for audibly prompting a trainee in rescue operations. The cover plate 18 is slidably mounted within grooves (not shown) of the body 12 of the training device and may be used to cover and protect the device CPR keypad 40. The CPR keypad 40 comprises a plurality of interactive key switches which are operative in the CPR mode 74 and are used by the trainee to provide feedback to the device 10 of the simulated victim's condition. The CPR keypad 40 includes an adult key 41, a baby key 42 and a child key 43 used by trainee to provide feedback to the device 10 of the victim's age. Additionally, the keypad 40 comprises a Heimlich maneuver labeled key "1" 44 used when victim is conscious and choking, and an abdominal thrust key "2" 45 utilized when the victim is unconscious with a blocked airway. Key "3" labeled Rescue breathing 46 is used when victim has a pulse but is unconscious, while key 4 47 labeled "CPR" is used when victim has been assessed by the trainee to be unconscious with no pulse or breathing. The CPR keypad 40 further comprises an off switch 48 which will switch off the device, and the pause key 49 which will pause the algorithm. The off switch is operative in all three modes, while the pause key is only active in both mode 76 and CPR mode 74. Finally, each of the keys (except the off key) on keypad has its own LED indicator light to indicate when the key has been activated by the trainee.

The front panel 14 further comprises an AED keypad 50 comprising an AED POWER switch 52, an ANALYZE switch 54, and a SHOCK switch 56. Each AED switch 52–56 has its own LED indicating light 58–62 to indicated that the switch has been activated when lit. In addition, the front panel of the device 10 further comprises a Select Prompting Mode switch 70 for allowing the trainee to select only defibrillation mode denoted as "AED" as mode 72 the CPR mode 74, or both CPR and AED prompts denoted as "Both" 76.

As shown in FIG. 3, the rear panel 16 of the device 10 comprises a power source 80 such as a battery pack and a Shock Sequence keypad 90. The Shock Sequence keypad 90 is used by the trainee or instructor to program the sequences of shockable and non-shockable simulated heart rhythms when in the AED mode 72 or CPR-AED mode 76, as explained in more detail below.

As shown in FIGS. 1 and 2, the front panel of the device 10 also comprises a plug receptacle 110 for receiving the plug end 112 of electrode cables 114. The plug end 112 of the electrode cables has a built in jumper (not shown) in order to indicate continuity of the plug connection when it is properly installed within receptacle 110. If not, trainee will be prompted to install the cable until the trainee has successfully plugged the electrode cable 114 into its receptacle 110–114.

The opposite ends of the electrode cables 114 all connected to disposable electrode pads 120 via an electrode clip 140. The disposable electrode pads 120 are simulated defibrillator pads and are to be inserted into the electrode clip 140 and then mounted by the trainee upon a simulated victim's chest as explained in more detail, below. The electrode clip 140 as best shown in FIGS. 4–6, comprises two main components made of any suitable non-conductive material such as plastic. The first main component of the electrode clip 140 is the housing 142 which has a first and second mating member 144,146, which together form a slot 148 for receiving an electrode training pad 120 therein. The first and second mating members 144,146 are connected together by a screw 150 or other connecting means. The second main component of the clip 140 is the securing means 160 which secures the electrode training pads 120 to the clip 140. The securing means 160 comprises a first and second arm 162 rotatably mounted to the clip housing 142, and a planar surface 164 with a tabular extension 166 for easy opening and closing of the clip securing means 160 to the housing 142. The inner surface of the tabular extension 166 has two spaced prongs 168 aligned for insertion into holes 169 of the first and second mating members 144,146 and holes 122 of the electrode pads 120.

Each electrode-training pad 120 is disposable and comprises an upper surface layer 123, a lower adhesive layer 124, and a conductive layer 126. The upper surface layer 123 of the training pad comprises a flexible plastic or foam material. The upper surface layer 123 of each training pad 120 is color coded with a graphic design 128 on the front surface layer 123 of the pads which illustrates the proper placement upon a victim's chest. The design further includes the number 1 or 2 that indicates the proper sequence of placement of the pads 120 upon the simulated victim's chest. The lower adhesive layer 124 of the electrode pads 120 has a removable protective liner 130 which is peeled away by the trainee prior to installation upon the simulated victim. The outer conductive layer 126 is adhered to the lower adhesive layer 124, and is formed of a thin plastic having a metallic or conductive substrate bonded thereto. The outer conductive layer 126 of each electrode training pad 120 acts as a built in sensor means which generates an output signal to the device 10 when the training pad is properly connected to the electrode clip 140 and placed in contact with a conductive target means 170. The conductive target means 170 is preferably an adhesive disc having an outer conductive layer such as metal. The conductive target means 170 are mounted upon a simulated victim's chest in the upper right chest and lower left rib position for defibrillation.

The sensor means 126 of the electrode training pad 120 as shown in FIG. 4 in phantom, has a first and second conductive path 132,134 respectively, with said second conductive path 134 preferably being located within the interior of said first conductive path 132, without touching said first conductive path 132. Preferably, each of said paths have an elongated rectangular shape, although other shapes would work for the invention. When the electrode pad 120 is received within the slot of the clip 160, the first and second conductive paths 132,134 of the sensor means 126 contact a first and second conducting strip 136,138 mounted upon the interior surface of the first mounting member 144 of the clip housing 142. The first and second conducting strip 136,138 is soldered to a first and second wire of the electrode cable 114 which has been inserted into the rear end of the clip housing 142.

Thus in order for the trainee to secure the removable electrode pads 120 to the clips 140, the holes 122 of the electrode training pad 120 are inserted through the slot 148 of the clip 140 such that the holes 122 and 169 are aligned. Then the clip securing means 160 is rotated into position such that the prongs 168 are inserted into the aligned holes 122 and 169, such that the first and second conducting strip 136,138 of the first mating member of the clip 140 contact with the conductive layer 126 of the electrode pads 120. After notched receiving end of the electrode pad 120 is inserted into the slot 148, the securing means 160 of the clip 140 is snapped into place such that the prongs 168 are inserted through holes 169 and 122 of the members and the electrode pad, respectively. When the trainee properly mounts each of the electrode pads within its clip 160 and properly places each electrode training pad 120 over its respective target means 170 on the simulated victim's chest, the target means 170 shorts or completes the circuit formed by the first and second conductive paths 132,134. When the circuit is closed, a small current is generated by the device 10 through the first conducting strip 136 and the first conductive path 132, through the target means 170 and then back to the device through the second conductive path 134 and the strip 138, thus indicating that the electrode training pad 120 has been properly placed upon the target 170. Each electrode training pad 120 must be properly placed over its conductive target 170, else the trainee will be continually prompted to "PLACE PADS ON VICTIMS BARE CHEST" until the operation is performed correctly for each pad 120. The trainee will continually be voice prompted until the sequence of operations has been correctly performed.

In an alternative embodiment of the invention, a reed switch is utilized as the sensing means in each disposable electrode pads. A reed switch may be attached to the outer surface layer of each electrode pad or mounted within the pad. The reed switch is used to sense when the pads are in close proximity to a target means having a magnet or magnetized surface. The target means are mounted in the proper area of a victim's chest for defibrillation. Alternatively, a magnet may be mounted upon the electrode pads and the reed switched mounted on the simulated victim's chest. When the reed switch is in close proximity to the target means, the reed switch generates an electric signal which is communicated to the device 10, and the trainee will no longer be prompted to "PLACE PADS ON VICTIM'S BARE CHEST".

Electrical System

Figure 9:
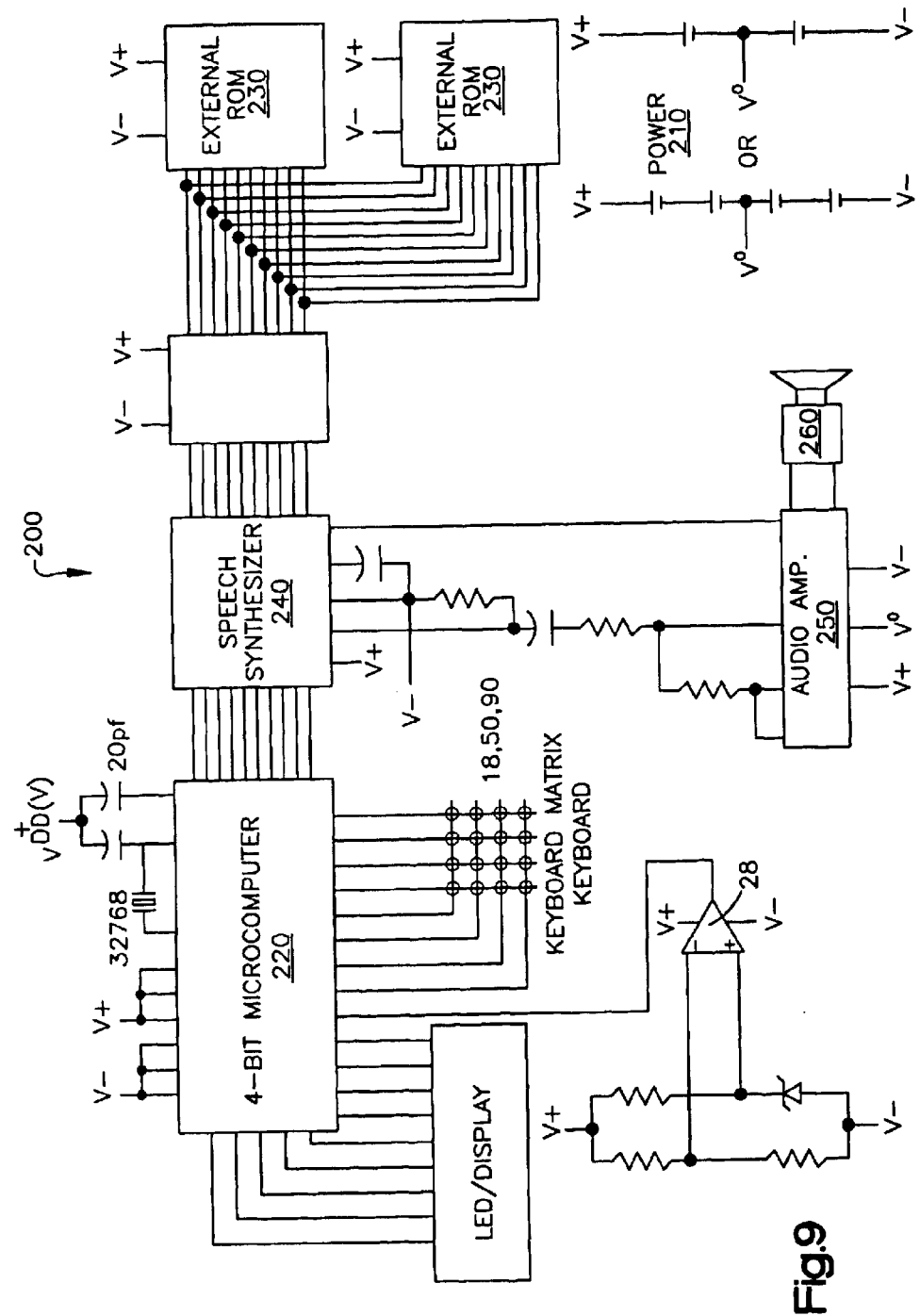
FIG. 9 is a block diagram of the CPR-AED training device of FIG. 1.

There is shown in FIG. 9, a block diagram illustrating the logical arrangement of a system 200 according to the invention. The invention includes a first and second electronic input device, which is preferably keypads 18 and 50 or other keying means. The invention also includes multiple button switches and LED indicator lights. An energy source 210 such as battery pack provides power to the system. The training device further comprises a central processing unit 220, memory 230 (ROM), and a speech synthesizer unit or chip 240. The speech synthesizer unit 240 is in electrical communication with an amplifier 250 and a speaker 260. The speech chip 280 may comprise any chip which furnishes understandable speech suitable for use in the invention. The speech synthesizer unit or chip 240 converts digital data stored in ROM and converts it to analog data.

Operation of the Device

In order to begin operation of the AED-CPR training device 10, the trainee first selects the desired training mode using the Prompting Mode switch 70. The AED-CPR training device 10 has three different training modes denoted as: "AED", "BOTH", and "CPR". If the AED mode is selected, the training device 10 will only provide training prompts that simulate the operation of an actual defibrillator device. The device 10 will first simulate the collection of patient ECG data, then simulate the analyzing of the ECG data by the training device and then the delivery of a simulated electrical pulse to a simulated patient in response to actuation by the trainee. No actual electrical pulse is delivered. If the CPR mode is selected by the trainee, the training device 10 will provide detailed training prompts for the proper sequence of CPR rescue steps. If the "BOTH" mode is selected, the device 10 will provide the trainee with CPR and AED prompts. The operation of these three modes is described in more detail, below.

AED Mode

If the trainee selects the AED mode by setting the Prompting Mode switch 70 to the "AED" position, the CPR panel 40 is deactivated and the AED panel 50 is activated. The AED mode has three programmable modes for the ANALYZE key. The ANALYZE key may be programmed using the Shock Sequence keypad 90 to toggle key 111 to simulate a manual defibrillator, a semi-automatic defibrillator or an automatic defibrillator. The programming steps are described in more detail, below.

Figure 12:
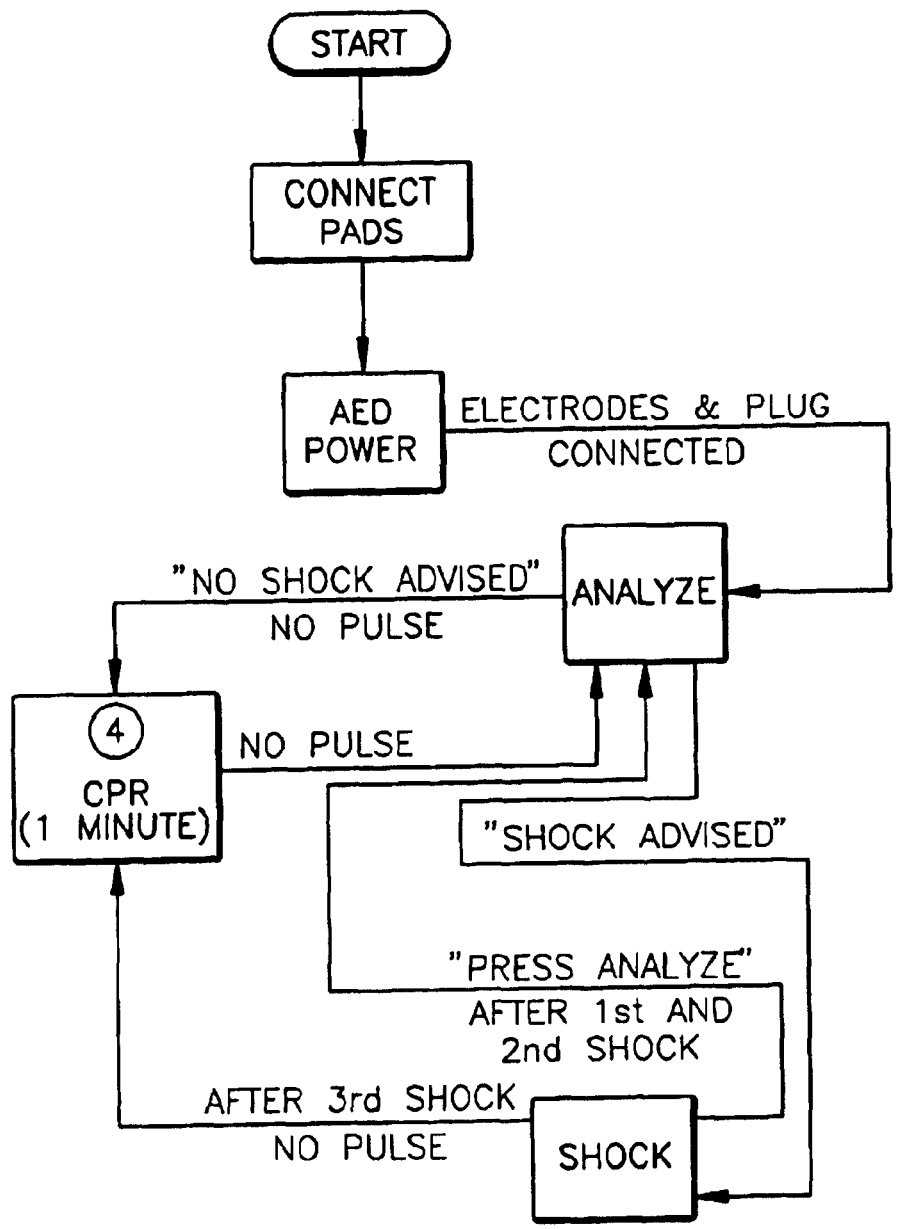
Figure 13:
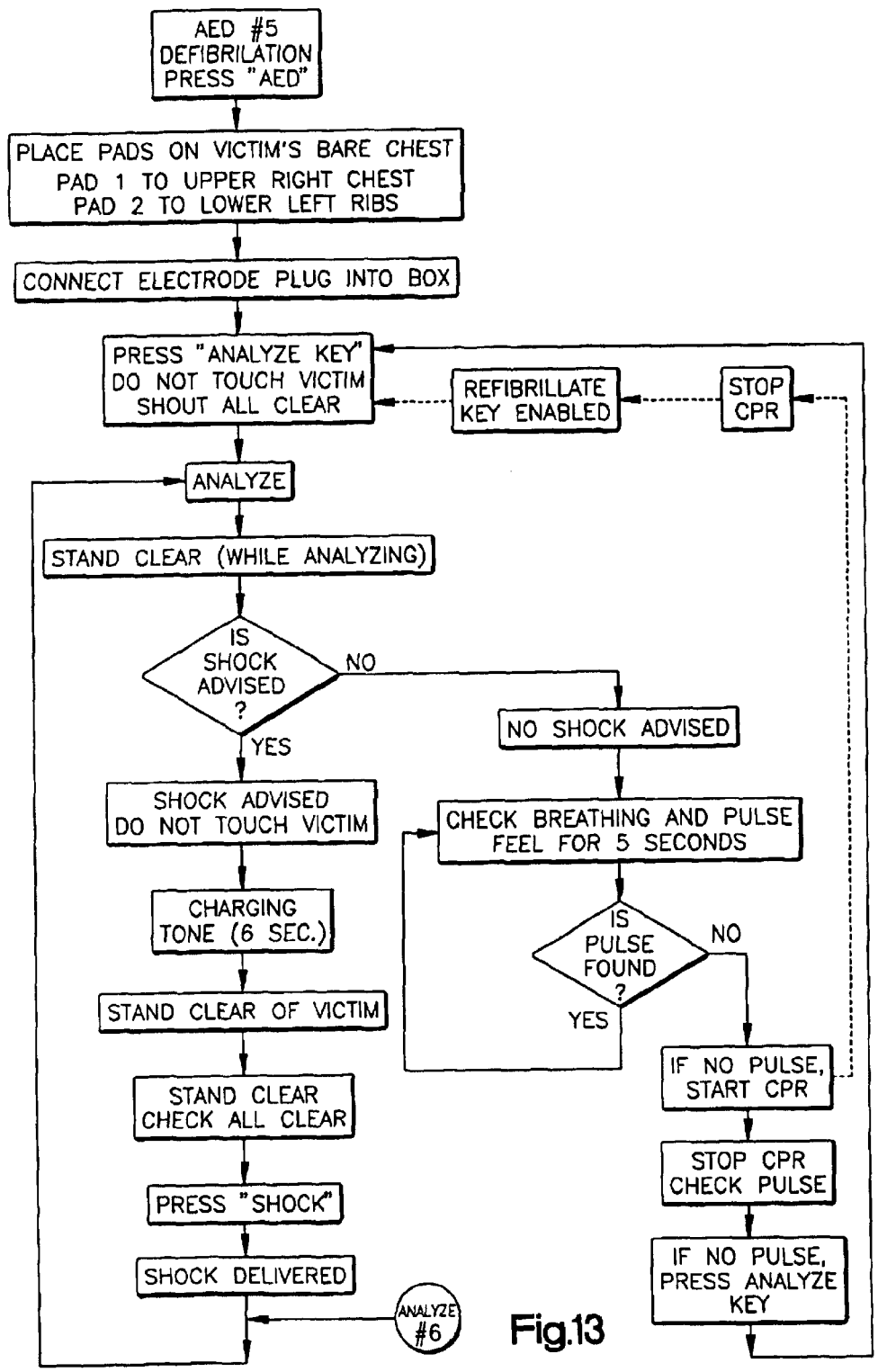
FIGS. 13–15 are program control logic diagrams of the prompting sequences of the CPR-AED training device in CPR Mode, AED Mode, and CPR-AED Mode, respectively.
Figure 14A:
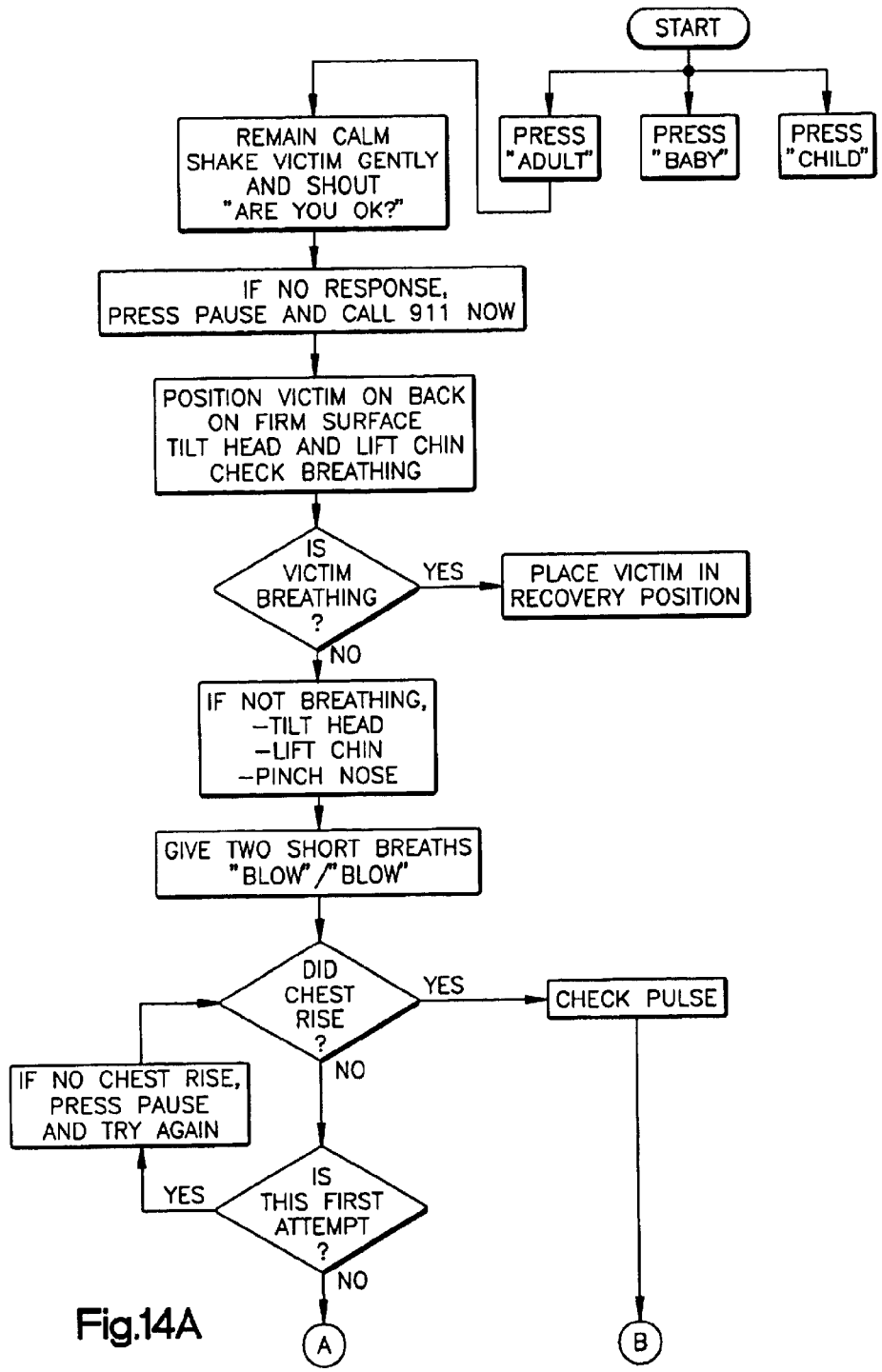
Figure 14B:
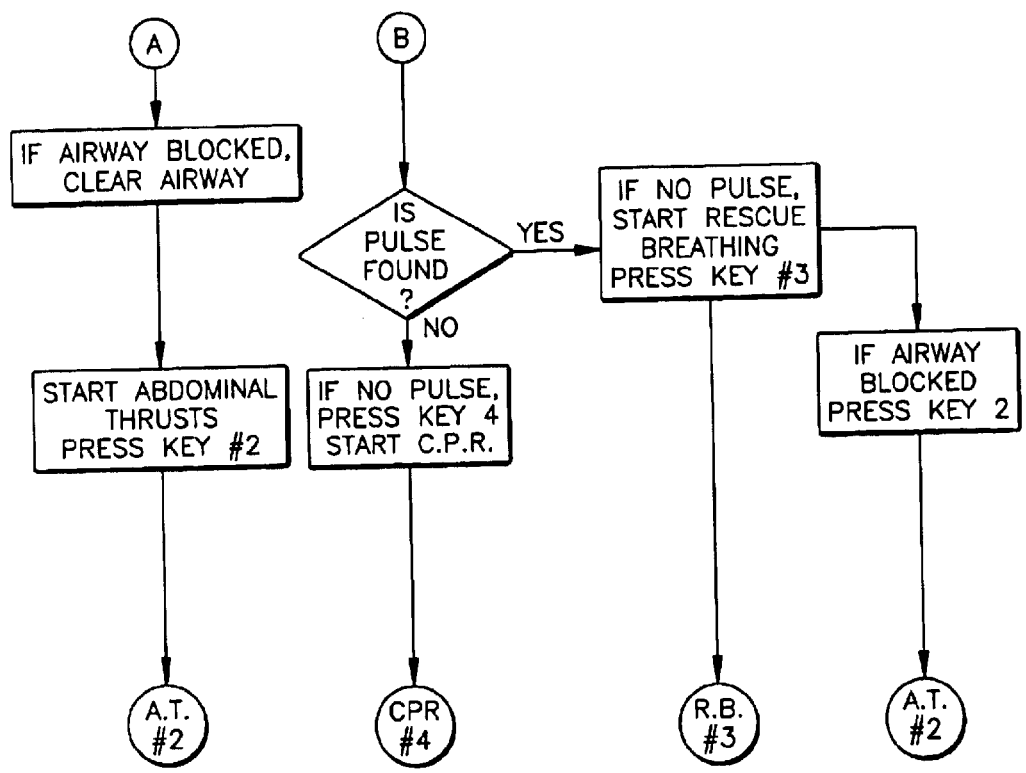
Figure 14C:
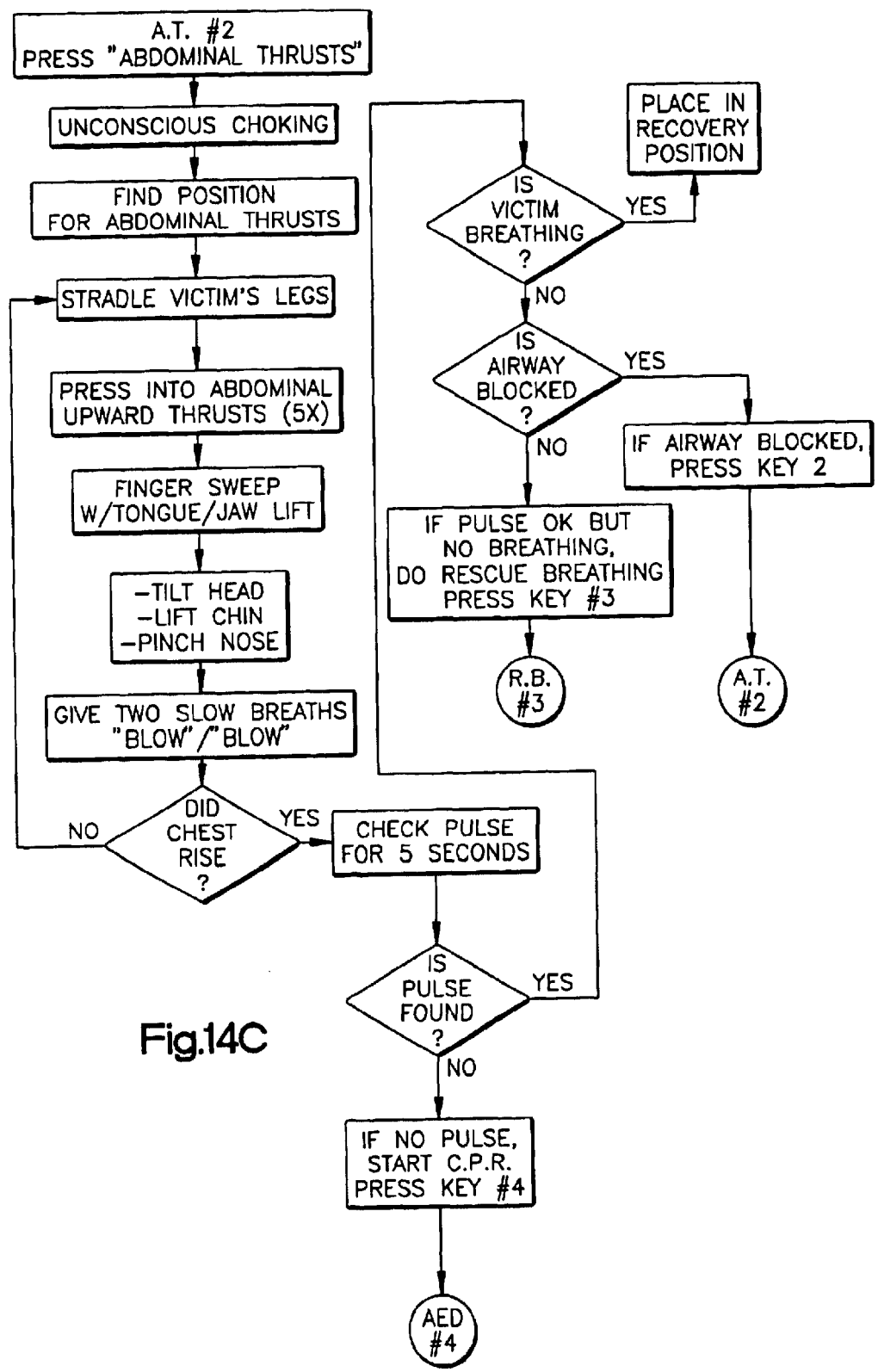
Figure 14D:
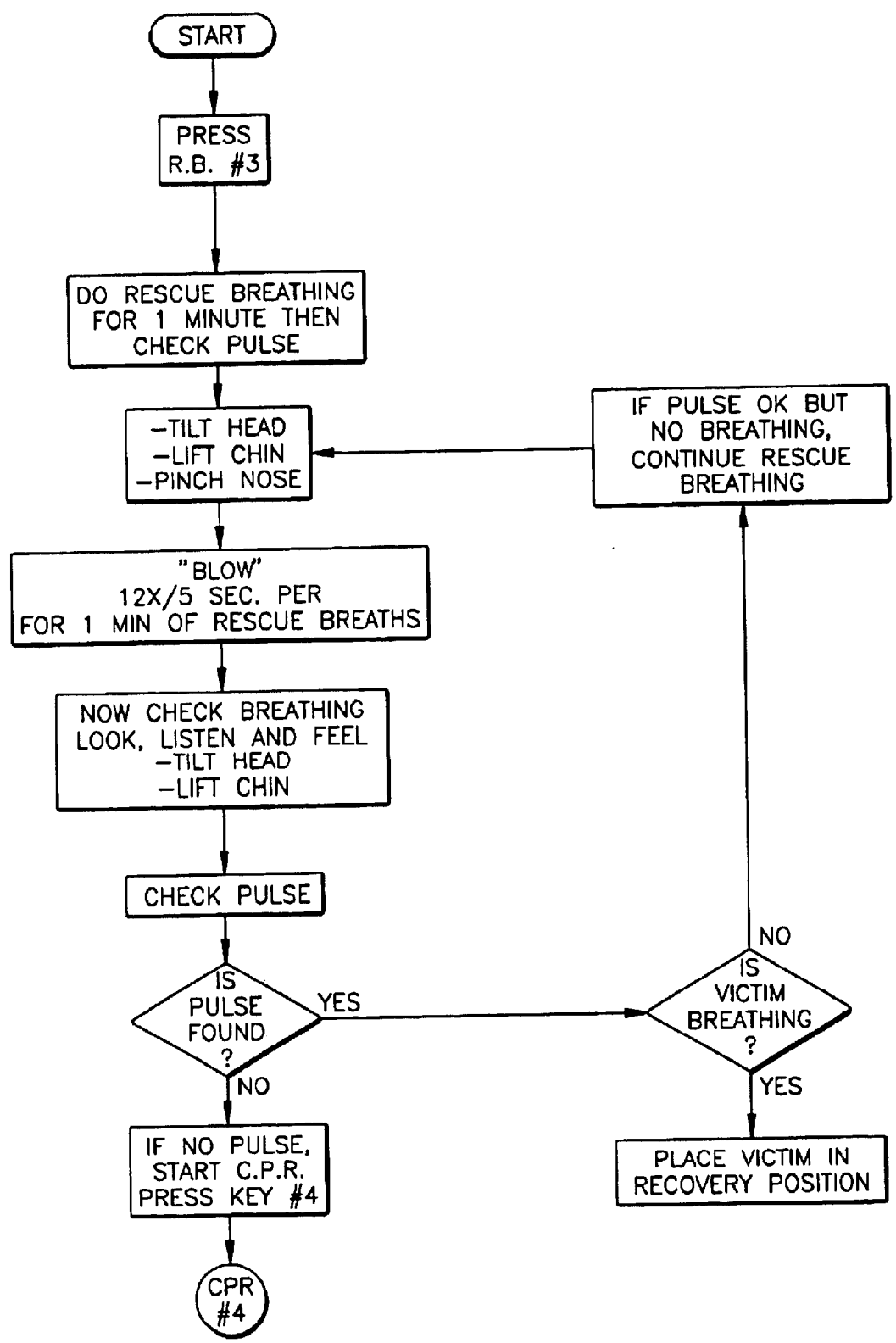
Figure 14E:
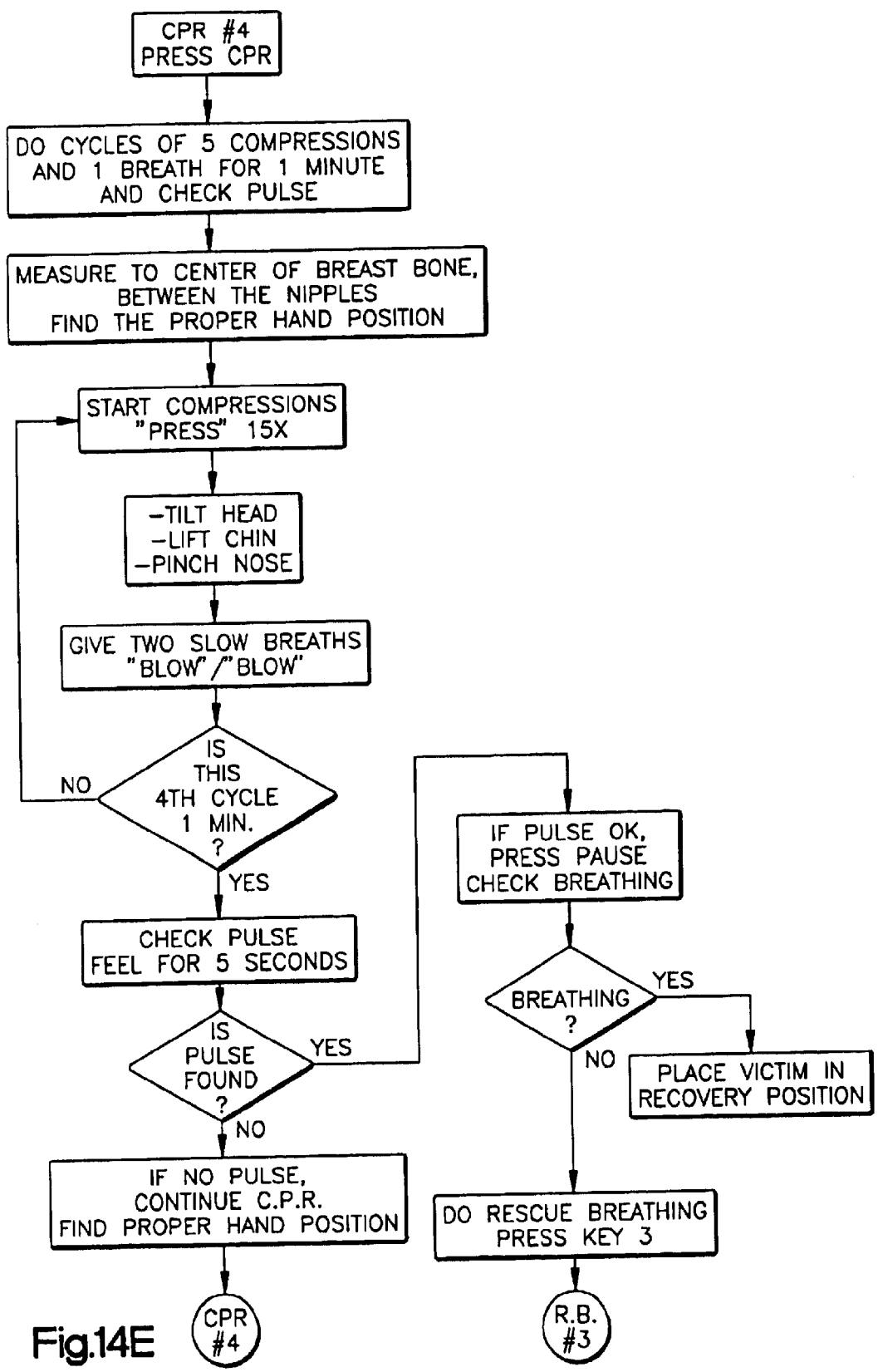
Figure 15:
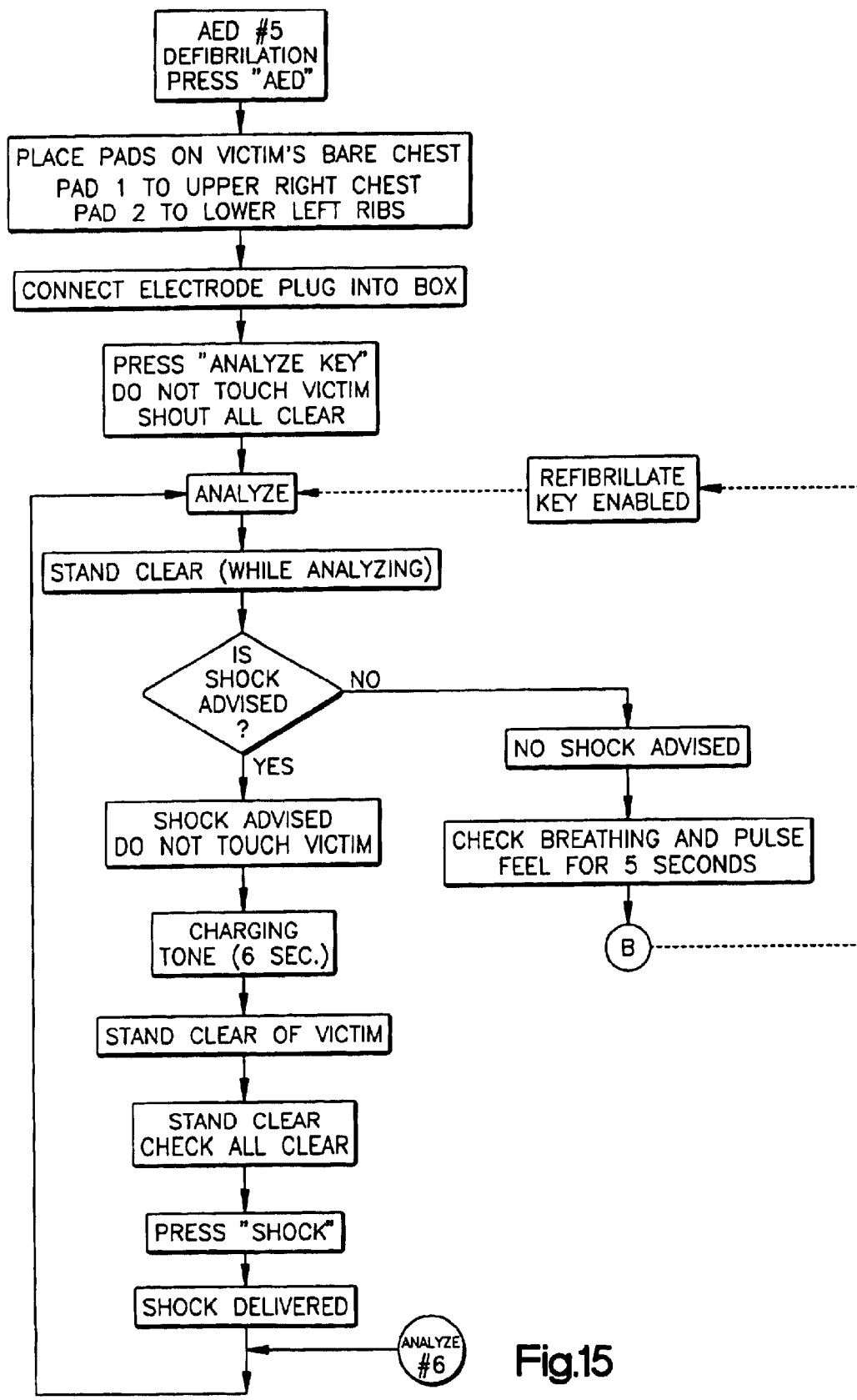

As illustrated in FIGS. 12 & 13, the simulation of a manual defibrillator in AED mode 72 is described as follows. The trainee must press the "AED" switch 52 in order to begin. The trainee is then prompted by the device to place the training electrode pads 120 on the simulated victim's bare chest, with pad "1" to be placed on victim's upper right chest and pad "2" to be positioned on victim's lower left ribs. If the training electrode pads are not placed on the simulated victim in the proper sequence, i.e., first training pad labeled "1" and then training pad labeled "2", the trainee will be continually prompted until the trainee performs the operation in the required sequence. Further, each training electrode pad 120 must be placed such that each of its respective sensors 132, 134 contacts the respective conductive target 170 located on the simulated victim 100 or manikin. The trainee will continue to be prompted until the trainee successfully performs the sequence of operations. The trainee will then be prompted to connect the electrode plug 112 into the plug receptacle 110 of the device 10. If the trainee performs this operation successfully, a jumper 113 located within the plug will complete the internal circuit. The device 10 senses that the plug 112 is installed when the jumper 113 completes the intended current.

After the training electrode pads 120 and the plug 112 of the electrode cable have been properly installed by the trainee, the trainee is prompted to press the "ANALYZE" switch 54 and to "STAND CLEAR" of the victim. The analyze LED 60 will flash on and off while the device simulates the Analyze function of a real defibrillator. The device 10 will have been previously programmed by an instructor or the trainee as described in more detail, below. The device will indicate to the user via voice prompting whether a shock is advised. If a shock is advised, the Analyze LED 60 will turn off and the shock LED light 62 will flash on and off, while the trainee is voice prompted "SHOCK ADVISED". If a shock sequence is advised, the trainee will be prompted to "STAND CLEAR" of the victim while a simulated charging tone is emitted from the speaker. The trainee is prompted to "SHOUT ALL CLEAR" and to check if all clear and then press the "SHOCK" key 56. When the "SHOCK" key 56 is pressed, the trainee will hear a simulated shock ready tone of approximately 15 seconds in duration and then a simulated shock delivered tone. Then the Shock LED light 62 will be deactivated. The trainee will be prompted to press the ANALYZE key 54 to repeat the process. If no shock is advised, the Analyze LED 60 is turned off and the trainee is prompted to check the simulated victim's breathing and pulse. If no pulse is detected, the trainee is prompted to do CPR for a 1 minute interval. If no pulse is detected by the simulated defibrillator after the trainee has performed CPR for a set interval of time, the trainee is prompted to check the victim's pulse, and if no pulse is found, to press the Analyze key 54.

The shock sequence as described above is programmable by the trainee or instructor using the shock sequence keypad 90 located on the rear panel. Thus the user may program the sequence of shock/no shock heart rhythms. Up to seven shock/no-shock sequences may be programmed. In order to program the device, the set key 92 is toggled on. Adjacent the set key 92 is seven toggle keys 93–99 labeled "1" through "7+", with each numbered key representing the numerical cycle of analyzed heart rhythms. Thus key "1" 93 represents the first cycle of simulated analyzed heart rhythms, key "2" 94 represents the second cycle of simulated analyzed heart rhythms, etc. Thus up to seven cycles may be programmed. In addition, each numerical key has its own LED indicator light 101 located immediately thereabove. The indicator light indicates (i.e., when lit) whether a shockable rhythm has been programmed. When the set key 92 is toggled on, the LED indicator lights 101 will light up if a shockable rhythm is desired for its respective numerical cycle. If the LED indicator light 101 is not lit, then the device will not recommend a shockable rhythm for that particular cycle. For example, if the American Heart Association recommended teaching shock sequence is: shock:shock:shock:no shock:shock:shock, then keys 1–3 and keys 5–7 will be toggled on such the their respective LED indicator lights 101 are lit. When finished programming, the set key 92 is toggled off.

The Shock Sequence Panel 90 also provides for turning on a "REFIBRILLATE" key 102. To program the device for the REFIBRILLATE function, the set key 92 is toggled on and then the REFIBRILLATE key 102 is toggled on such that the LED indicator light 103 labeled "ON" lights up. The set key 92 is then toggled off. In order to use this feature, a non shockable rhythm must have been programmed. After the trainee receives the first "NO SHOCK ADVISED" prompt, the trainee will be instructed to "CHECK BREATHING AND PULSE", and "IF NO PULSE PERFORM CPR". The CPR interval will be interrupted to instruct the trainee that the victim has went into a shockable rhythm. The trainee will be prompted to press the ANALYZE key. Thus when the REFIBRILLATE key is activated, a simulation of a non-shockable rhythm which converts into a shockable rhythm is demonstrated.

The Shock Sequence panel 90 also provides for the simulation of a manual, semi-automatic or automatic defibrillator by programming the Analyze key 105. The simulation of a semi-automatic defibrillator is the same as the manual defibrillator as described above, except the trainee is not prompted to press the Analyze key after it has been pressed once by the trainee. The simulation of an automatic defibrillator is the same as the above description, except the trainee is not prompted to press the ANALYZE key at anytime, as the device automatically goes into the simulated Analyze mode.

The Shock Sequence panel 90 also provides for the altering of the CPR prompting based upon the number of rescuers present for the CPR mode. After the set key 92 is toggled on, the "ADULT/CPR/TIME" key 106 may be set to either "1 Rescuer" 107 or "2 Rescuer" 108 mode. The timing of the CPR interval and the breathing rate will be affected. For 1 Rescuer attending a victim, the trainee will be prompted to do cycles of 5 chest compressions and 1 breath for 1 minute, while 2 Rescuers will be prompted to do cycles of 15 compressions and 2 breaths for 1 minute intervals. In addition, the Shock Sequence panel 90 also allows the trainee to program short or long prompting scripts for the rescue instructions for the AED, CPR or AED/CPR modes of operation by selecting the "PROMPTING FORMAT" key 109 and setting it to "short" or "long" formats. The "short" prompting format contains only the essential prompting queues, while "long" format gives trainee more detailed instructions. In addition, the Shock Sequence Panel 90 provides for programming the CPR interval, i.e., the time CPR is prompted, to 30, 60 or 90 second intervals.

CPR Mode

Figure 10:
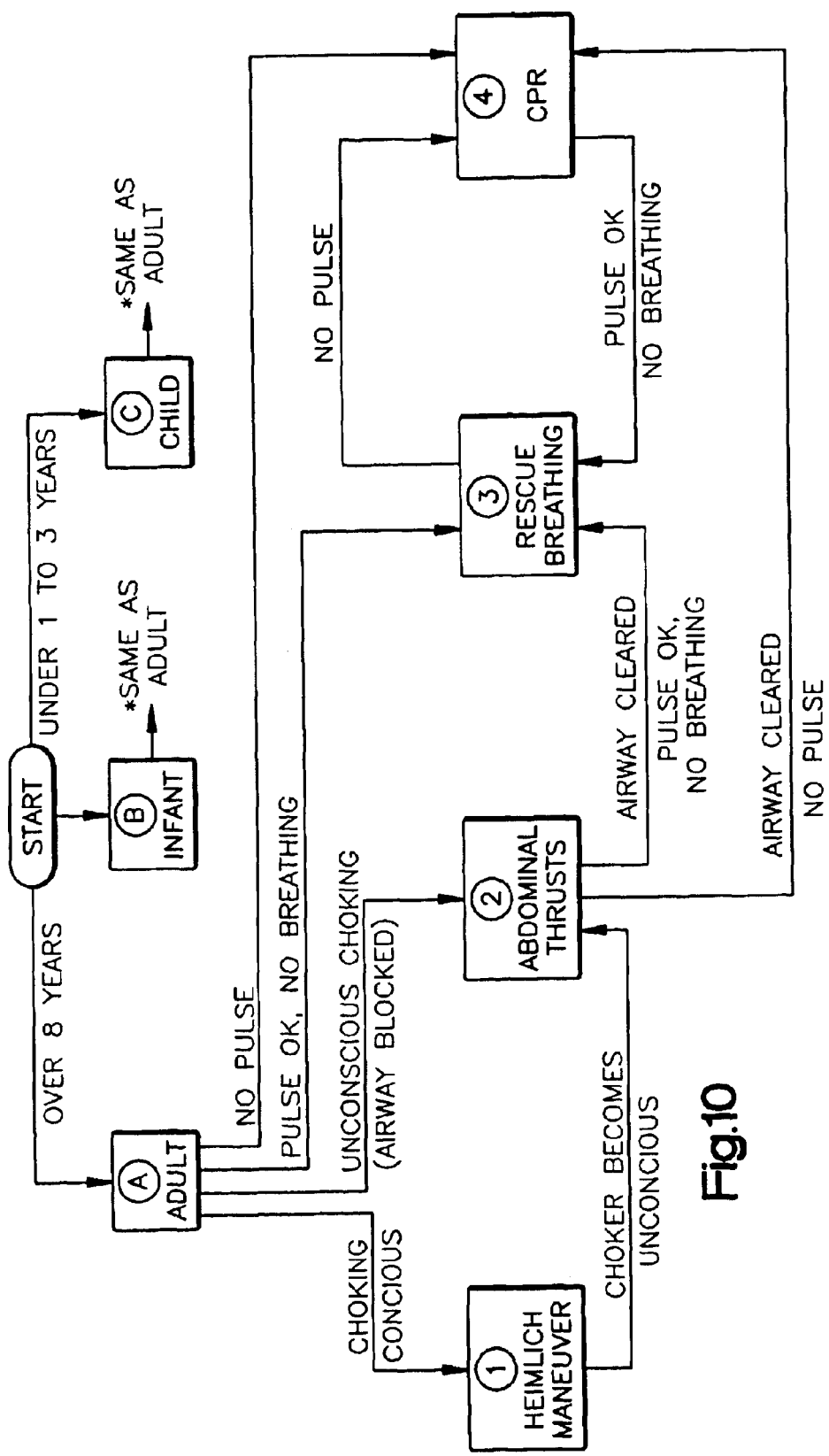
FIGS. 10–12 are logic diagrams of the CPR-AED training device in the CPR ONLY Mode, the AED MODE, and the CPR-AED Mode.
Figure 11:
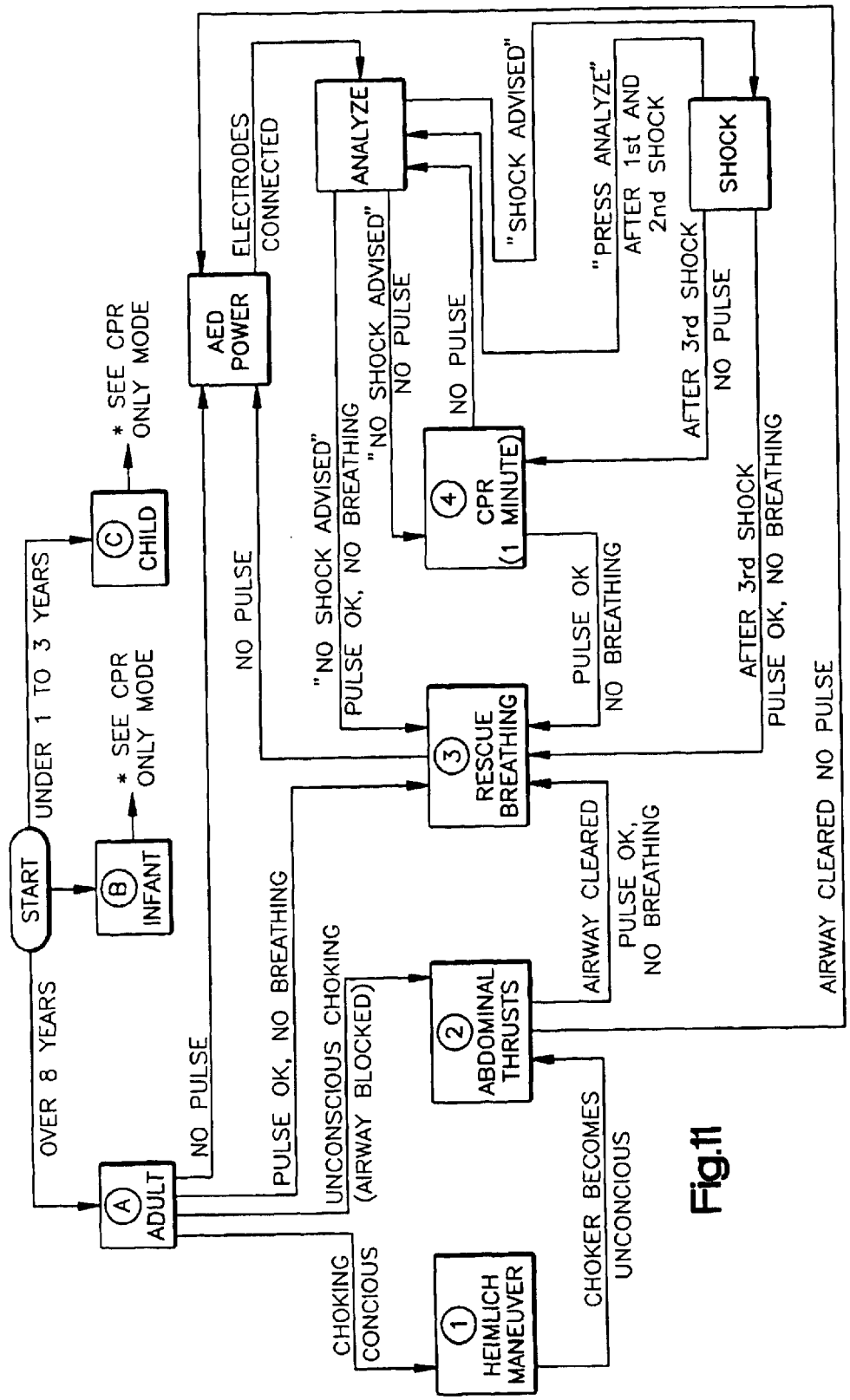

When the trainee manually sets the SELECT PROMPTING MODE switch 70 to CPR mode 74, the trainee will receive instructive prompts for performing CPR in conjunction with other rescue operations such as the HEIMLICH maneuver, abdominal thrusts and rescue breathing. In order to activate the device in this mode, the trainee must assess the victim's age and select the appropriate ADULT, BABY or CHILD key. As shown in FIGS. 10 and 13, the trainee will be prompted to "REMAIN CALM; SHAKE VICTIM GENTLY AND SHOUT ARE YOU OKAY; IF NO RESPONSE CALL 911 NOW." Next the trainee is prompted to "POSITION THE VICTIM ON HIS OR HER BACK ON A FIRM SURFACE." and to "TILT HEAD; LIFT CHIN; CHECK BREATHING." The trainee is then prompted to assess whether the victim is breathing. If the victim is not breathing, the trainee is instructed to "TILT HEAD LIFT CHIN; PINCH NOSE; BLOW; BLOW." The trainee is then prompted to press pause key and repeat the above steps if no chest rise. The trainee will then be prompted to CHECK THE VICTIM'S PULSE. If a pulse is found but the victim is not breathing, the trainee is prompted to press Key 3 (Rescue Breathing). If no pulse is found, the trainee is instructed to press KEY 4 CPR. IF the victim's airway is blocked, the trainee is prompted to press KEY 2 for abdominal thrust prompting.

CPR Plus AED (Both) Mode

When the trainee manually sets the SELECT PROMPTING MODE switch to BOTH, the trainee will receive instructive prompts for performing CPR in conjunction with use of a defibrillator. The user may initiate this mode by pressing the ADULT key after assessing the victim's age. If the BABY or CHILD key is pressed, the trainee will be prompted that he or she has pressed a wrong key, because infants or children are not recommended to receive defibrillation. After the ADULT key is selected, the trainee will be prompted as described above under the CPR mode. However, if no pulse is found, the trainee is instructed to press the AED power key 52 instead of the CPR key 4. The AED sequence of prompting is as described above under the AED ONLY section.

While the preferred embodiments of the invention have been illustrated and described, it should be understood that variations will become apparent to those skilled in the art. Accordingly, the invention is not to be limited to the specific embodiments illustrated and described herein, but rather the true scope and spirit of the invention are to be determined by reference to the appended claims.

What is claimed is:

1. An interactive electronic training device used with electrode pads and a simulated patient for obtaining indirect information about a simulated patient's condition from an operator pertinent to an analysis of the simulated patient's condition, and for prompting an operator on the medically appropriate steps for defibrillation in conjunction with CPR in response thereto, said device comprising:
    a portable, hand held interactive processor including an output device and one or more input devices for obtaining indirect information pertinent to an analysis of the simulated patient's condition from the operator, and
    said interactive processor responsive to said one or more input devices for determining the medically appropriate steps for defibrillation integrated with the medically appropriate steps for CPR;
    said output device responsive to said interactive processor for prompting the operator on the medically appropriate steps for defibrillation integrated with the medically appropriate steps for CPR in response thereto
    said output device including a speech synthesizer for communicating information in a simulated voice to the operator.

2. The interactive electronic training device of claim 1, wherein the one or more input devices are buttons.

3. The interactive electronic training device of claim 1, wherein the interactive processor further includes a second output device for producing a simulated shock to the simulated patient.

4. The interactive electronic training device of claim 3, wherein the second output device is further adapted for generating audible tones for simulating applying a defibrillation shock to the simulated patient.

5. The interactive electronic training device of claim 4, wherein the one or more input devices communicates to the interactive processor information indicating whether or not the simulated patient is conscious.

6. The interactive electronic training device of claim 5, wherein the one or more input devices communicates to the interactive processor information indicating whether or not the patient is an adult, baby or child.

7. The interactive electronic training device of claim 4, wherein the one or more input devices communicates to the interactive processor the assent of the operator before producing the simulated defibrillation pulse.

8. The interactive electronic training device of claim 3 further including a third output device for simulating the detecting of the electrical activity of the simulated patient's heart.

9. The interactive electronic training device of claim 1 further comprising a programmable control panel having two or more input devices for generating a first and second signal to the interactive processor, each signal representing either a shock cycle or a no shock cycle; and the interactive processor further comprising control logic responsive to said first and second signals for outputting a simulated shock sequence of a shock cycle or no shock cycle representative of said first and second signals.

10. The interactive electronic training device of claim 9 wherein the programmable control panel is located on the interactive electronic training device.

11. The interactive electronic training device of claim 7 wherein the programmable control panel further comprises a refibrillate input key.

12. An interactive defibrillator training system for providing an operator instructions on aiding a simulated victim and the proper placing of electrode pads thereon, the device comprising:

a portable, hand held interactive processor comprising one or more input devices for obtaining indirect information from the operator about the simulated victim;

said interactive processor responsive to said indirect information for prompting an operator on the proper steps for using said interactive defibrillator training system;

a simulated victim having a simulated first and second chest region with target means positioned on the first and second chest region in the proper area for mounting electrode pads;

each of said electrode pads having an internally mounted sensor in electrical communication with said interactive processor for outputting a signal when said sensor is in electrical communication with said target means; said sensor further comprising a first and second conductive path, wherein said second conductive path is located within the first conductive path; and said interactive processor further comprising an output device and adapted for generating one or more output signals responsive to said signal from said electrode pad;

said output device including a speech synthesizer for communicating information in a simulated voice to the operator.

* * * * *